US008994610B2

(12) United States Patent
Tricoukes et al.

(10) Patent No.: US 8,994,610 B2
(45) Date of Patent: Mar. 31, 2015

(54) USER CONFIGURABLE HEADSET (75) Inventors: Nicole Tricoukes, Seaford, NY (US); Thomas K. Roslak, Northport, NY (US); Mitchell Maiman, Holbrook, NY (US); Jorg Schlieffers, Abington (GB)

(73) Assignee: Symbol Technologies, Inc., Holtsville, NY (US)

( * ) Notice: Subject to any disclaimer, the term of this patent is extended or adjusted under 35 U.S.C. 154(b) by 1131 days.

(21) Appl. No.: 12/941,140

(22) Filed: Nov. 8, 2010

(65) Prior Publication Data
US 2012/0114131 A1    May 10, 2012

(51) Int. Cl.
G09G 5/00 (2006.01)
H04R 1/10 (2006.01)
H04R 5/033 (2006.01)

(52) U.S. Cl.
CPC .............. H04R 1/105 (2013.01); H04R 5/033 (2013.01); H04R 2420/07 (2013.01); H04R 2420/09 (2013.01); H04R 2460/07 (2013.01)
USPC .......................................... 345/8; 361/679.03

(58) Field of Classification Search
CPC ............. H04M 1/05; H04M 1/72522; H04M 1/72563; H04R 2201/107; H04R 5/0335; H04R 5/033; H04R 1/105; G02B 27/017; G02B 2027/0132; G02B 2027/0178; G02B 2027/0154; G02B 2027/0156; G02B 2027/0158; G06F 1/163; G06F 1/1632; G06F 1/1656; H04N 5/7491; A42B 1/245
USPC .......................................................... 345/7, 8
See application file for complete search history.

(56) References Cited

U.S. PATENT DOCUMENTS

| 4,138,598 | A | * | 2/1979 | Cech ............................ 379/430 |
| RE30,662 | E | * | 6/1981 | Foley ............................ 379/430 |
| 4,499,593 | A | * | 2/1985 | Antle ............................ 381/378 |
| 5,003,300 | A | * | 3/1991 | Wells ................................. 345/8 |
| 5,117,464 | A | * | 5/1992 | Jones et al. ..................... 381/379 |
| 5,233,650 | A | * | 8/1993 | Chan ............................ 379/430 |
| 5,457,751 | A | * | 10/1995 | Such ............................ 381/375 |
| 5,589,846 | A | * | 12/1996 | Kobayashi ........................ 345/8 |
| 5,767,820 | A | | 6/1998 | Bassett et al. |
| 5,844,656 | A | * | 12/1998 | Ronzani et al. ............... 351/158 |
| 6,034,653 | A | * | 3/2000 | Robertson et al. ................ 345/8 |
| 6,234,446 | B1 | | 5/2001 | Patterson |
| 6,356,635 | B1 | * | 3/2002 | Lyman et al. .................. 379/430 |
| 6,359,602 | B1 | * | 3/2002 | Amafuji et al. ..................... 345/8 |
| 6,480,174 | B1 | * | 11/2002 | Kaufmann et al. ............... 345/8 |
| 7,091,928 | B2 | | 8/2006 | Rajasingham |

(Continued)

OTHER PUBLICATIONS

Non-Final Office Action mailed on Aug. 22, 2012 in related U.S. Appl. No. 12/603,888, Tricoukes, Nicole, filed on Oct. 21, 2009.

Primary Examiner — Gregory J Tryder (57) ABSTRACT

A headset is described. The headset includes a frame configured to be worn substantially behind the ears of a user. The frame includes a top surface having a first plurality of attachment features and a bottom surface having a second plurality of attachment features. A boom is mechanically coupled to the frame. The boom supports an electronic device. A band is configured to be worn substantially across the crown of the head of the user. The band can be detachably coupled to the first plurality of attachment features such that the boom is oriented on a first side of the frame in a first mode of operation. The band can be detachably coupled to the second plurality of attachment features such that the boom is oriented on a second side of the frame in a second mode of operation.

22 Claims, 10 Drawing Sheets (56) References Cited

U.S. PATENT DOCUMENTS

| | | |
|---|---|---|
| 7,542,012 B2 | 6/2009 | Kato et al. |
| 7,773,767 B2 * | 8/2010 | Wahl et al. .................... 381/377 |
| 7,956,822 B2 | 6/2011 | Nakabayashi et al. |
| 8,072,393 B2 | 12/2011 | Riechel |
| 8,237,627 B2 | 8/2012 | Nakabayashi et al. |
| 8,289,231 B2 | 10/2012 | Budd et al. |
| 8,443,467 B2 * | 5/2013 | Chiang ............................. 2/209 |
| 8,761,428 B2 * | 6/2014 | Amae ........................... 381/378 |
| 8,848,940 B2 * | 9/2014 | Tricoukes et al. ............. 381/74 |
| 2002/0131616 A1 * | 9/2002 | Bronnikov et al. ........... 381/370 |
| 2004/0001588 A1 * | 1/2004 | Hairston ....................... 379/419 |
| 2004/0008158 A1 * | 1/2004 | Chi et al. .......................... 345/8 |
| 2004/0021619 A1 * | 2/2004 | Kiyokawa ......................... 345/8 |
| 2006/0090246 A1 * | 5/2006 | Cozens et al. .................... 2/209 |
| 2006/0238878 A1 * | 10/2006 | Miyake et al. ................ 359/630 |
| 2007/0223766 A1 * | 9/2007 | Davis et al. ................... 381/379 |
| 2009/0268935 A1 * | 10/2009 | Dillinger ....................... 381/371 |
| 2010/0014699 A1 * | 1/2010 | Anderson et al. ............. 381/375 |
| 2010/0188314 A1 | 7/2010 | Miyake et al. |
| 2011/0089207 A1 | 4/2011 | Tricoukes et al. |
| 2012/0114131 A1 | 5/2012 | Tricoukes et al. |

* cited by examiner

USER CONFIGURABLE HEADSET

TECHNICAL FIELD

The invention relates generally to configuring a headset for multiple modes of operation.

BACKGROUND

Headsets including booms are generally used for hands-free communication. The boom includes a microphone and the frame of the headset includes a speaker. The headset can include a single speaker or a pair of speakers (i.e., one for each ear). The boom is rotatable relative to the frame to allow the user to wear the headset in either a left or right configuration. For example, the boom can be positioned on either the left or right side of a user's face.

SUMMARY

In one aspect, the invention is embodied in a headset. The headset includes a frame configured to be worn substantially behind the ears of a user. The frame includes a top surface having a first plurality of attachment features and a bottom surface having a second plurality of attachment features. A boom is mechanically coupled to the frame. The boom supports an electronic device. A band is configured to be worn substantially across the crown of the head of the user. The band can be detachably coupled to the first plurality of attachment features such that the boom is oriented on a first side of the frame in a first mode of operation. The band can be detachably coupled to the second plurality of attachment features such that the boom is oriented on a second side of the frame in a second mode of operation.

In one embodiment, the first of the frame is opposite to the second side of the frame. The electronic device can be a display, a microphone and camera or a data capture device. The boom can be flexible. The mechanical coupling that couples the boom to the frame can be a rotary coupling. A speaker can be coupled to the frame and positioned proximate to an ear of the user.

The band can be fabricated from a flexible material. A power supply, such as a battery, can be coupled to the frame. The power supply provides power to the electronic device. A processing module can also be coupled to the frame. The frame can also include one or more cushions contacting the head of the user.

In one embodiment, the headset includes mechanical posts having a plurality of attachment features that correspond to the first and the second plurality of attachment features. The band is detachably coupled to the plurality of attachment features.

In another aspect, the invention is embodied in a headset having a frame that is configured to be worn substantially behind the ears of a user. The frame includes a top surface having a first plurality of attachment features and a bottom surface having a second plurality of attachment features. A boom is mechanically coupled to the frame. The boom is configured to support a display. A band is configured to be worn substantially across the crown of the head of a user. The band can be detachably coupled to the first plurality of attachment features such that the boom is oriented on a left side of the frame in a first mode of operation and the band can be detachably coupled to the second plurality of attachment features such that the boom is oriented on a right side of the frame in a second mode of operation.

The left side of the frame is opposite to the right side of the frame. The display can be a micro-display. The boom can be flexible. The band can be fabricated from a flexible material. A processing module can be coupled to the frame. A power supply, such as a battery, can also be coupled to the frame to provide power to the processing module and the display. The frame can also include one or more cushions contacting the head of the user.

In one embodiment, the headset includes a plurality of mechanical posts having a plurality of attachment features that correspond to the first and the second plurality of attachment features. The band is detachably coupled to the plurality of attachment features. The mechanical coupling that couples the boom to the frame can be a rotary coupler.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to conventional headsets, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to systems utilizing headsets. In an exemplary embodiment, a headset can be configurable to be worn on the left or right side of the user's head.

Figure 1:
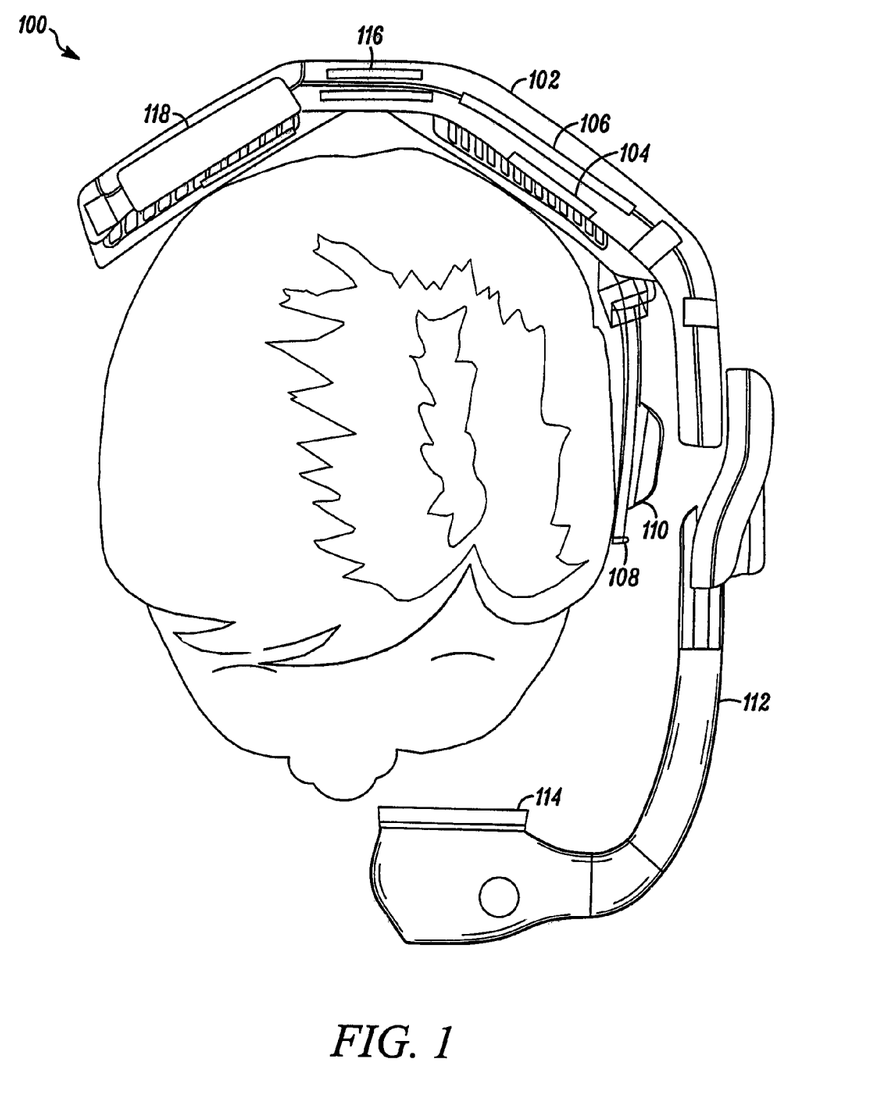
FIG. 1 is a top view of a headset according to one embodiment of the invention.

FIG. 1 is a top view of a headset 100 according to one embodiment of the invention. The headset 100 includes a frame 102. The frame 102 can house electronic components, including internal communication components 104 and circuitry 106 as further described with relation to FIG. 2 to enable the headset 100 to operate and to communicate wirelessly with other devices. The frame 102 also contains I/O devices such as a microphone 108 and a speaker 110.

A boom 112 is coupled to the frame 102. A display 114 is coupled to an end of the boom 112. The display 114 can be a micro-display that displays information. Alternatively, the headset 100 can include two displays. The two displays can be positioned on the boom 112 or each display can be positioned on a separate boom. The headset 100 can also include one or more motion tracking components 116, such as a digital compass, a gyroscope, an accelerometer or a global positioning system (GPS) module, which can track the location of the headset 100. In some embodiments, the headset 100 includes more or less than all of the I/O devices shown in FIG. 1. The headset 100 can also include a portable power supply, such as a battery 118 for powering the headset 100.

Figure 2:
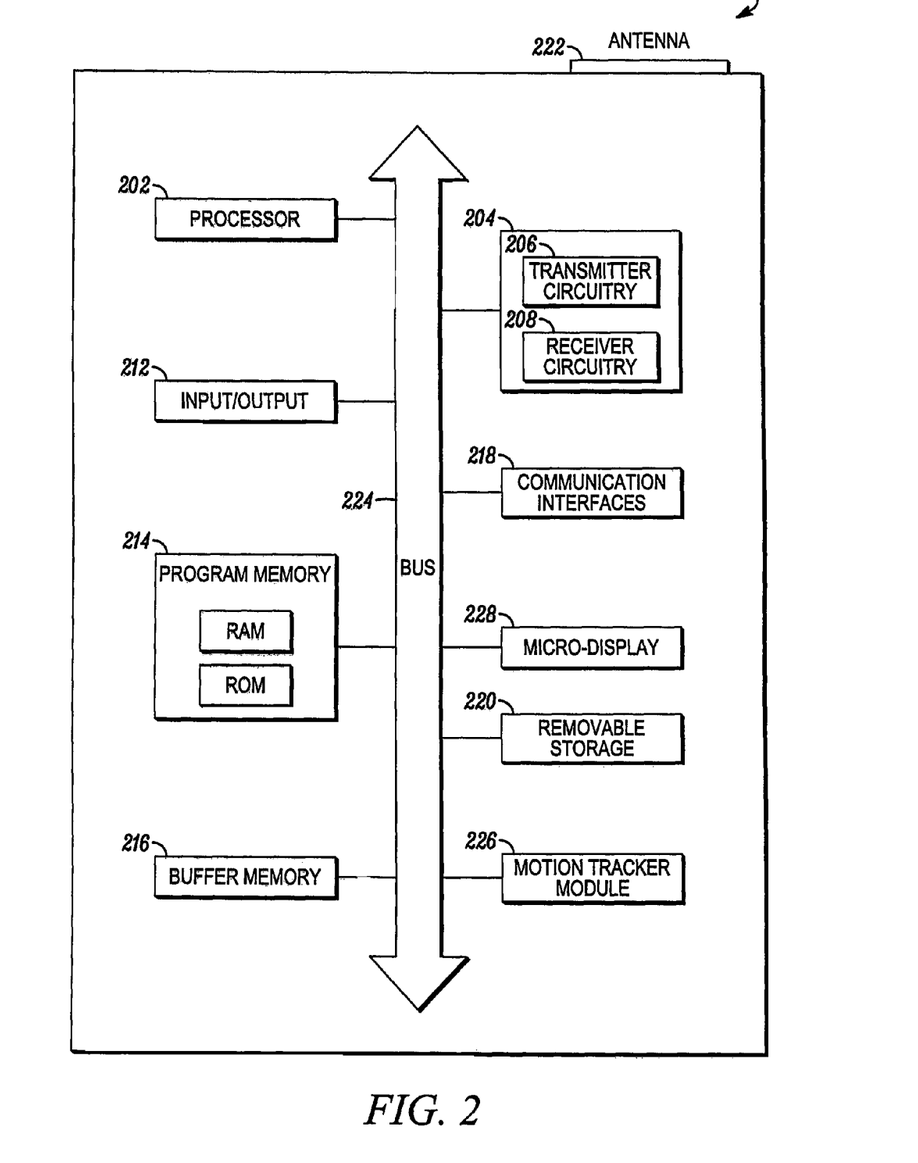
FIG. 2 is a block diagram illustrating the electronic components of the headset of FIG. 1.

FIG. 2 is a block diagram 200 illustrating the electronic components of the headset 100 (FIG. 1) according to the invention. The headset 100 contains, among other components, a processor 202, a transceiver 204 including transmitter circuitry 206 and receiver circuitry 208, an antenna 222, the I/O devices 212 described in relation to FIG. 1, a program memory 214 for storing operating instructions that are executed by the processor 202, a buffer memory 216, one or more communication interfaces 218, an optional removable storage 220, a motion tracking module 226 which can include a global positioning system (GPS) and a micro-display 228. The headset 100 is preferably an integrated unit containing the elements depicted in FIG. 2, as well as any other element necessary for the headset 100 to function. In one embodiment, the electronic components are connected by a bus 224.

The processor 202 can include one or more microprocessors, microcontrollers, DSPs, state machines, logic circuitry, or any other device or devices that process information based on operational or programming instructions. Such operational or programming instructions are preferably stored in the program memory 214. The program memory 214 can be an IC memory chip containing any form of random access memory (RAM) or read only memory (ROM), a floppy disk, a compact disk (CD) ROM, a hard disk drive, a digital video disk (DVD), a flash memory card or any other medium for storing digital information. Skilled artisans will recognize that when the processor 202 has one or more of its functions performed by a state machine or logic circuitry, the program memory 214 containing the corresponding operational instructions may be embedded within the state machine or logic circuitry. Operations performed by the processor 202 as well as the headset 100 are described in detail below.

The transmitter circuitry 206 and the receiver circuitry 208 enable the headset 100 to respectively transmit and receive communication signals. In this regard, the transmitter circuitry 206 and the receiver circuitry 208 include circuitry to enable wireless transmissions. The implementations of the transmitter circuitry 206 and the receiver circuitry 208 depend on the implementation of the headset 100 and the network with which it is to communicate. In one embodiment, the transmitter and receiver circuitry 206, 208 can be implemented as part of the communication device hardware and software architecture in accordance with known techniques. For example, the headset 100 can communicate through a cellular network such as a code division multiple access (CDMA) network or a global system for mobile communications (GSM) network. In one embodiment, the transmitter and receiver circuitry 206, 208 can communicate with a local area network (LAN).

One of ordinary skill in the art will recognize that most, if not all, of the functions of the transmitter or receiver circuitry 206, 208 can be implemented in a processor, such as the processor 202. However, the processor 202, the transmitter circuitry 206, and the receiver circuitry 208 have been partitioned herein to facilitate a better understanding of the functions of these elements. In one embodiment, the antenna 222 is a cellular antenna coupled to the transceiver 204. The antenna 222 can also be a LAN antenna or a Bluetooth antenna.

The buffer memory 216 may be any form of volatile memory, such as RAM, and is used for temporarily storing received information. The removable memory 220 can be a secure digital (SD) memory card, for example.

The motion tracking module 226 can be implemented as a stand-alone module within the headset 100. In one embodiment, the module can include a global positioning system (GPS) having a satellite receiver that communicates with global positioning satellites to provide a position of the headset 100. Global positioning systems use the technique of triangulation to determine the position of a GPS receiver on the surface of the Earth.

The memory 214 can store instructions to be executed on the processor 202 and the processor 202 can instruct the micro-display 228 to display data. In general, the processor 202 of the headset 100 includes processing logic configured to carry out the functions, techniques, and processing tasks associated with the operation of the headset 100. Furthermore, the steps of a method or algorithm described in connection with the embodiments disclosed herein may be embodied directly in hardware, in firmware, in a software module executed by the processor 202, or any combination thereof. Any such software may be implemented as low level instructions (assembly code, machine code, etc.) or as higher-level interpreted or compiled software code (e.g., C, C++, Objective-C, Java, Python, etc.).

In operation, the headset 100 is positioned on a user's head. The headset 100 can include adjustable parameters to create a customizable fit. The boom is adjustable to position the display 228 proximate to an eye of the user. The user can interact with the headset 100 by speaking into a microphone which can be located on the boom or on the frame of the headset 100. Alternatively, the user can interact with the headset through a Bluetooth or similar connection with an external device, such as a mobile computing device (not shown). In one embodiment, the headset 100 includes the motion tracking module 226 which tracks the movement of a user's head wearing the headset 100.

Figure 3:
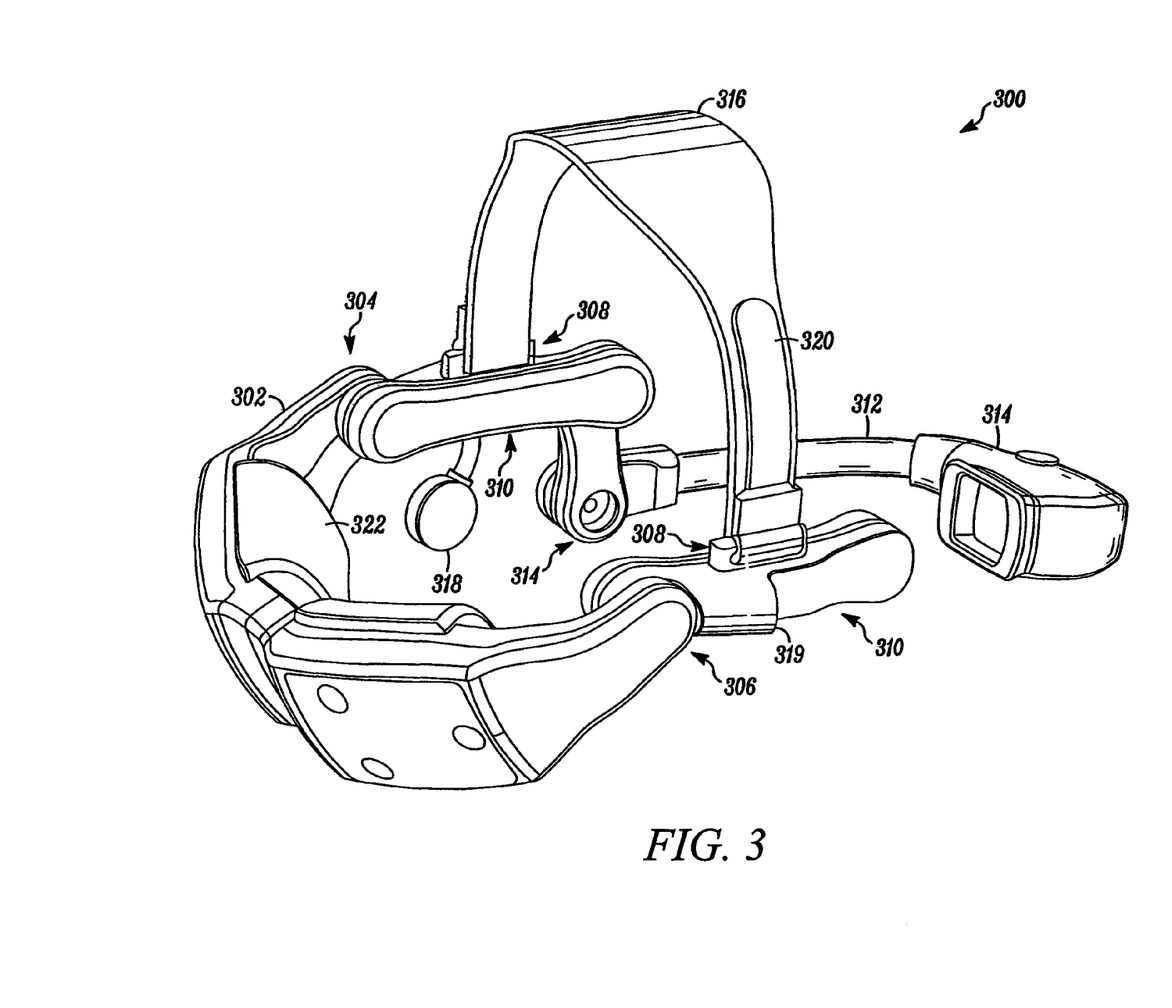
FIG. 3 illustrates a perspective view of a headset according to one embodiment of the invention.

FIG. 3 illustrates a perspective view of a headset 300 according to one embodiment of the invention. The headset 300 includes a frame 302 for supporting the electronic and mechanical components of the headset 300. The frame 302 can be formed from a single piece of material. Alternatively, the frame 302 can be formed from multiple pieces of material coupled together. The frame 302 is configured to be worn substantially behind the ears of a user. The frame 302 is designed to distribute the weight of the electronic and mechanical components across the back of the user's head. Additionally, the frame 302 is designed to allow a user to wear a hard hat and/or safety glasses while wearing the headset 300.

The frame 302 includes a top surface 304 and a bottom surface 306. The top surface 304 includes a first set of attachment features 308. The bottom surface 306 includes a second set of attachment features 310 that correspond to the first set of attachment features 308.

A boom 312 is mechanically coupled to the frame 302 through a mechanical coupling 314. The mechanical coupling 314 can be a rotary coupling, a linear coupling or any other suitable coupling. In practice, the boom 312 can be mechanically coupled to the frame 302 through any suitable technique. In one embodiment, the boom 312 is flexible. The boom 312 supports an electronic device 314. The electronic device 314 can be a display module including a micro-display. In other embodiments, the electronic device 314 is a data capture device, a camera, or a microphone, for example. In practice, any suitable electronic device can be supported by the boom 312.

A band 316 is configured to be worn substantially across the crown of the head of the user. The band 316 can be detachably coupled to the first set of attachment features 308 on the frame 302. In this mode of operation, the boom 312 is located on the left side of the user's face. In a second mode of operation, the band 316 can be detachably coupled to the second set of attachment features 310 on the frame 302. In this mode of operation, the boom 312 is located on the right side of the user's face. Thus, in one embodiment, the boom 312 is located on the first side of the frame 302, and in another embodiment, the boom 312 is located on the second side of the frame 302, which is opposite to the first side of the frame 302.

A speaker 318 can also be coupled to the frame 302. The speaker 318 can provide audio output to the user. In one embodiment, the position of the speaker 318 is adjustable to accommodate the various modes of operation of the headset 300. In one embodiment, a camera 319 is coupled to the frame 302 on the side opposite to the boom 312. The camera 319 can be a video camera, for example. In practice, any desired module can be fitted to the frame 302, such as a flashlight, for example.

The band 316 can be fabricated from a flexible material, such as cloth, plastic, rubber or sheet-metal, for example. In practice, any suitable material can be used. In one embodiment, the band 316 is replaceable in order to protect the health of each subsequent user of the headset 300. The length of band 316 is adjustable using straps 320. In one embodiment, one or more cushions 322 can be coupled to the frame 302. In operation, the back of the user's head contacts the cushions 322. The cushions 322 provide comfort and stability when the user is wearing the headset 300.

The frame 302 can also house a battery and a processing module (not shown). The battery can be a rechargeable battery. The processing module can include a microprocessor, memory and any other components required to operate the headset 100. The frame 302 can also include one or more ports or connectors, such as a universal serial bus (USB) port.

Figure 4A:
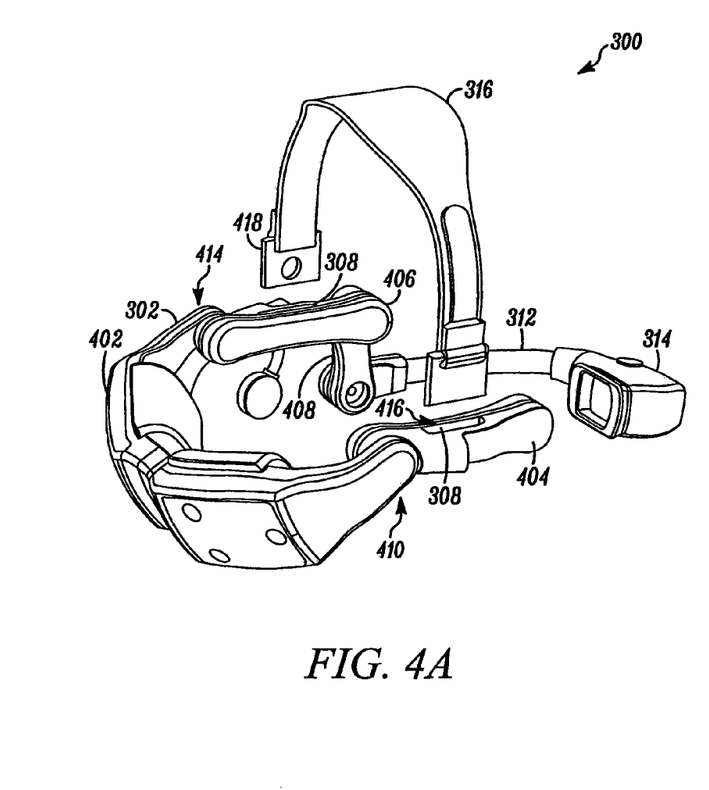
FIG. 4A and FIG. 4B illustrate perspective views of the headset in alternate configurations.
Figure 4B:
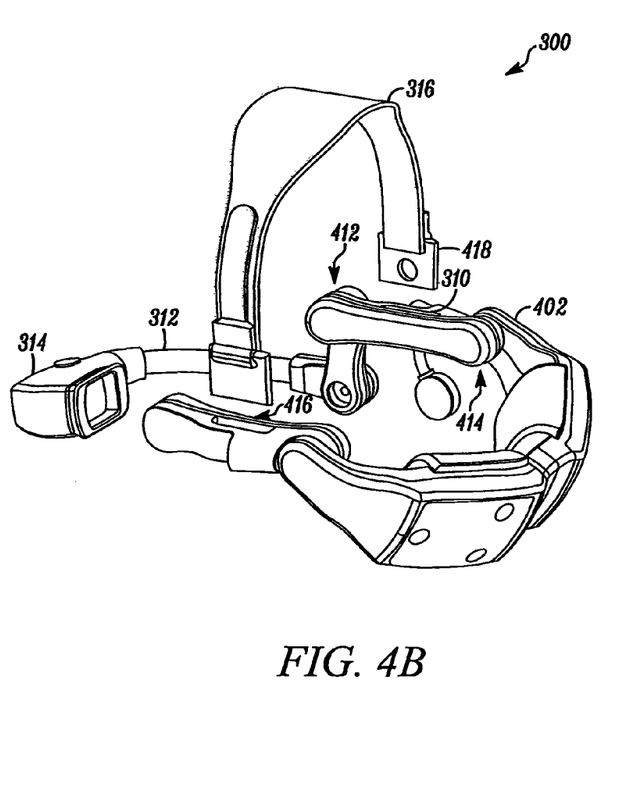

FIG. 4A and FIG. 4B illustrate perspective views of the headset 300 in alternate configurations. FIG. 4A corresponds to a first mode of operation in which the boom 312 is positioned proximate to the left side of the user's face. In an embodiment in which the electronic device 314 is a display, this configuration is appropriate for a left eye dominant user since the display will be viewed using the user's left eye. In this embodiment, the frame 302 is fabricated from multiple sections 402, 404, 406, and 408. The sections 402, 404, 406, and 408 are coupled together using mechanical couplings 410, 412, 414. The mechanical couplings 410, 412, 414 allow the sections to rotate relative to each other.

For illustrative purposes, the band 316 is shown detached from the frame 302. The band 316 can be detachably coupled to the first set of attachment features 308.

In an alternate configuration shown in FIG. 4B, the frame 402 is turned upside down, thereby revealing the second set of attachment features 310. The band 316 can be detachably coupled to the second set of attachment features 310. In an embodiment in which the electronic device 314 is a display, this configuration is appropriate for a right eye dominant user since the display will be viewed using the user's right eye.

In one embodiment, the first and second sets of attachment features 308, 310 are pockets 416 that accept tabs 418 attached to the band 316. Skilled artisans will appreciate that various mechanical techniques can be used to detachably couple the band 316 to the frame 302 without departing from the spirit and scope of the invention.

Figure 5:
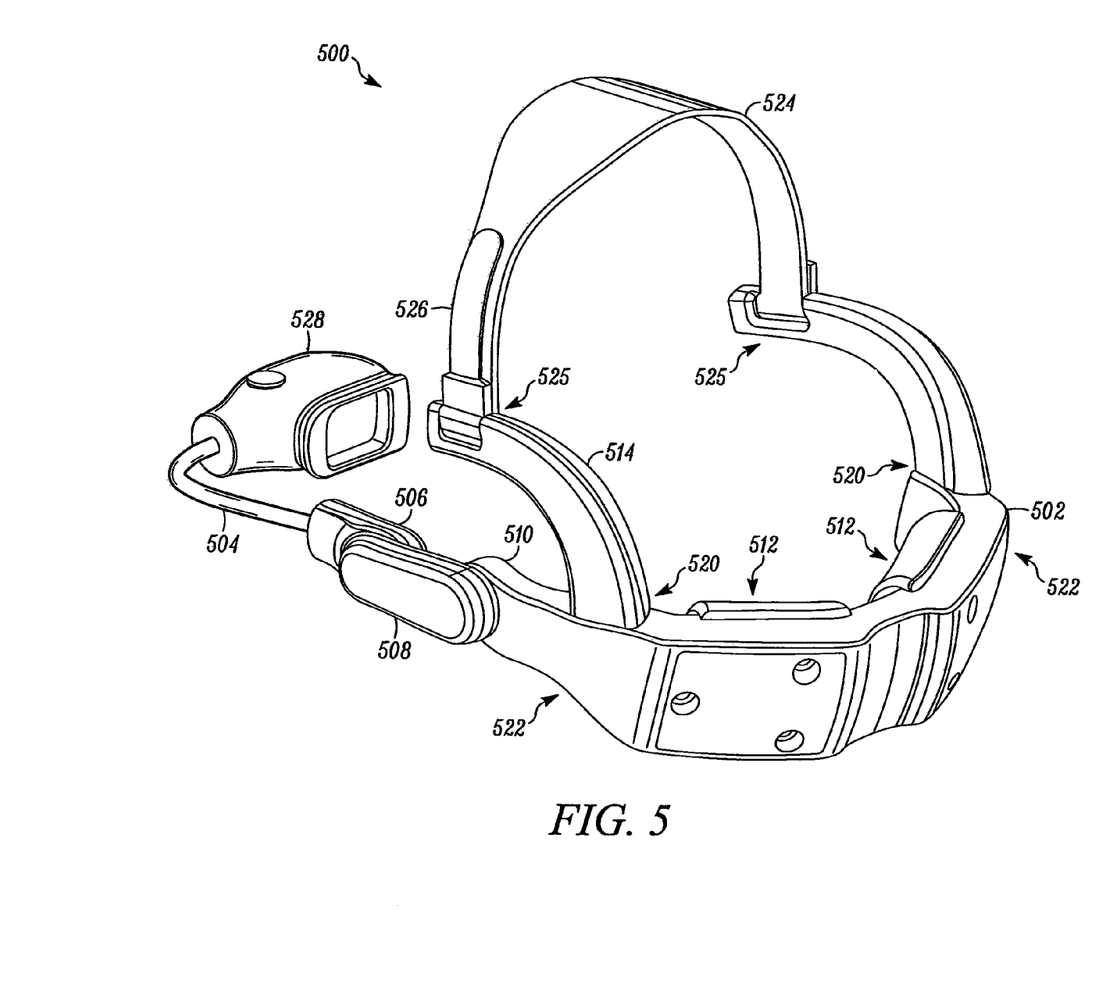
FIG. 5 illustrates a perspective view of a headset according to another embodiment of the invention.

FIG. 5 illustrates a perspective view of a headset 500 according to another embodiment of the invention. The headset 500 includes a frame 502. The frame 502 is configured to be worn substantially behind the ears of the user and on the back of the user's head. A boom 504 is coupled to the frame 502 through a mechanical coupling 506. An extender 508 can be coupled to the frame 502 though a mechanical coupling 510 to increase the adjustability of the boom 504 relative to the frame 502. One or more cushions 512 can also be coupled to the frame 502. The cushions 512 provide comfort and stability to the headset 500.

The headset 500 also includes mechanical posts 514, 516 detachably coupled to the frame 502 though a first set of attachment features 520 located on the top surface of the frame 502. A second set of attachment features 522 are located on the bottom surface of the frame 502.

A band 524 is coupled to the mechanical posts 514, 516 through mechanical features 525. The band 524 includes adjustable straps 526 to adjust the length of the band 524. The band 524 can be fabricated from a flexible material. The adjustable straps 526 can include Velcro®-type closures to securely fix the length of the band 524. Other suitable techniques can also be used to fix the length of the band 524.

In operation, the user sets the frame 502 on the back of the head such that the band 524 is positioned substantially across the crown of the head. The user adjusts the length of the band 524 until the frame 502 is located in a comfortable position. The user then adjusts the boom 504 until the electronic device 528 is located in the appropriate position.

Figure 6A:
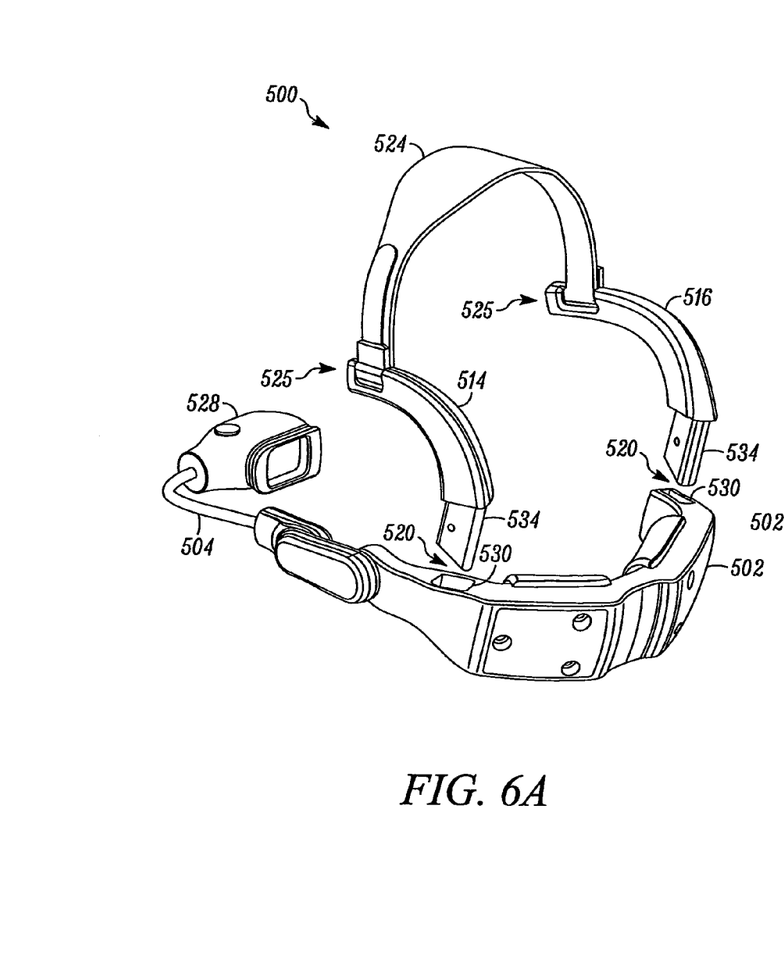
FIG. 6A and FIG. 6B illustrate perspective views of the headset in alternate configurations.
Figure 6B:
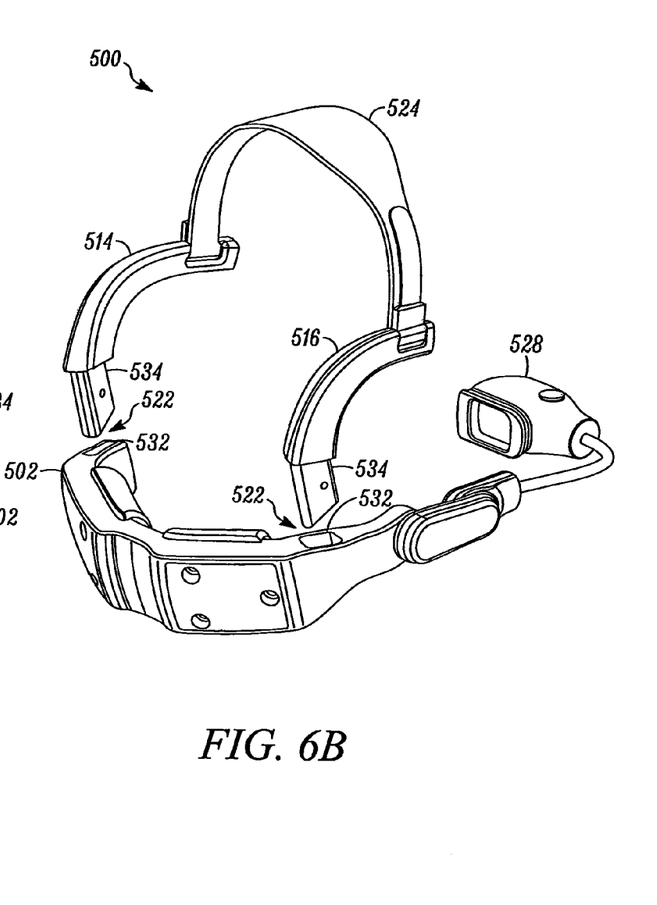

FIG. 6A and FIG. 6B illustrate perspective views of the headset 500 in alternate configurations. FIG. 6A corresponds to a first mode of operation in which the boom 504 is positioned proximate to the left side of the user's face. In an embodiment in which the electronic device 528 is a display, this configuration is appropriate for a left eye dominant user since the display will be viewed using the user's left eye.

For illustrative purposes, the mechanical posts 514, 516 are shown detached from the frame 502. The mechanical posts 514, 516 can be detachably coupled to the first set of attachment features 520. The band 524 is coupled to the mechanical posts 514, 516 through attachment features 525.

In an alternate configuration shown in FIG. 6B, the frame 502 is turned upside down, thereby revealing the second set of attachment features 522. The mechanical posts 514, 516 can be detachably coupled to the second set of attachment features 522. In an embodiment in which the electronic device 528 is a display, this configuration is appropriate for a right eye dominant user since the display will be viewed using the user's right eye.

In one embodiment, the first and second sets of attachment features 520, 522 are pockets 530, 532 that accept tabs 534 of the mechanical posts 514, 516. Skilled artisans will appreciate that various mechanical techniques can be used to detachably couple the mechanical posts 514, 516 to the frame 502 without departing from the spirit and scope of the invention.

Figure 7:
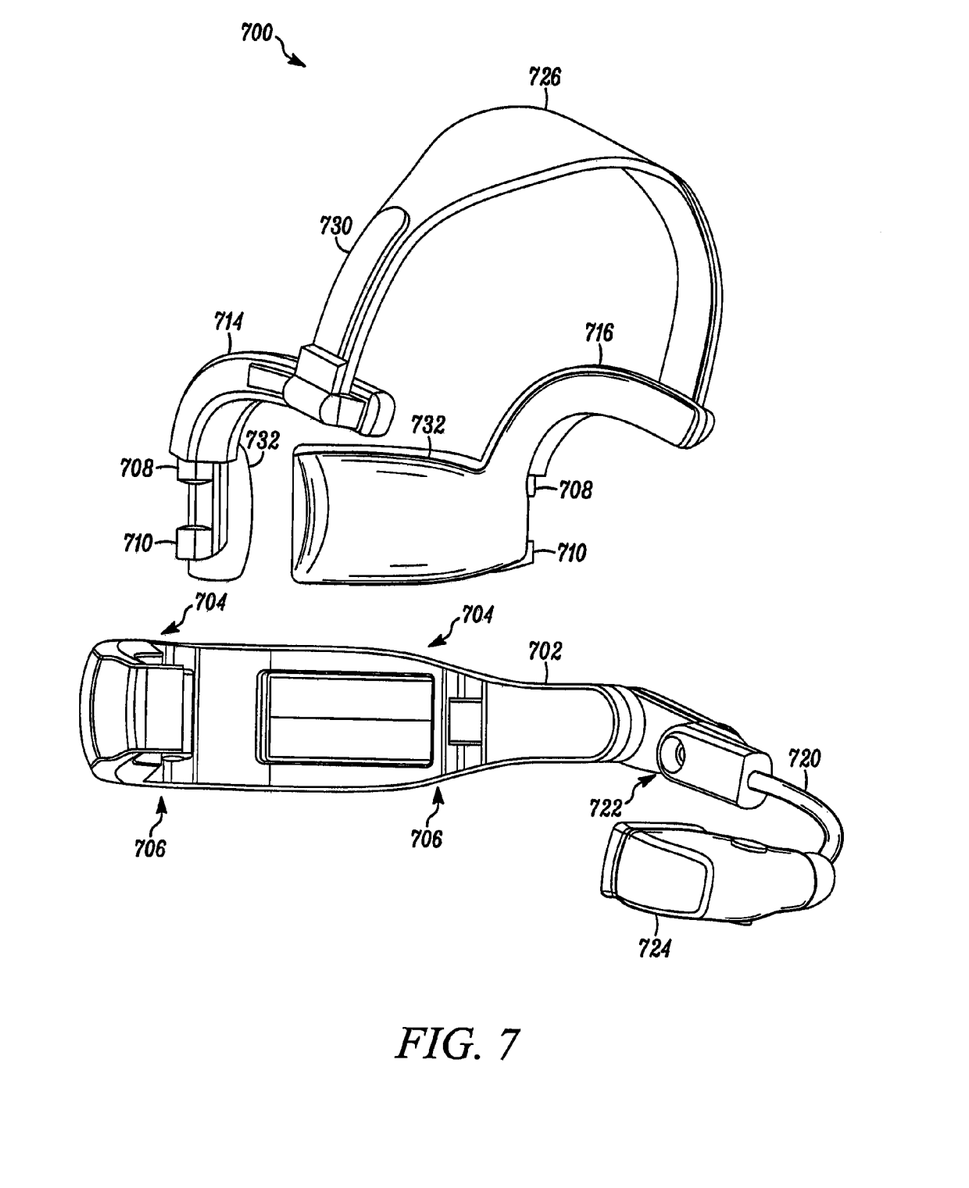
FIG. 7 illustrates a perspective view of a headset according to another embodiment of the invention.

FIG. 7 illustrates a perspective view of a headset 700 according to another embodiment of the invention. The headset 700 includes a frame 702 for supporting the electronic and mechanical components of the headset 700. The frame 702 is configured to be worn substantially behind the ears of a user. The frame 702 includes a first set of attachment features 704. A second set of attachment features 706 correspond to the first set of attachment features 704.

The first and second set of attachment features 704, 706 engage with corresponding mechanical features 708, 710 on mechanical posts 714, 716. Thus, the mechanical posts 714, 716 are detachably coupled to the frame 702.

A boom 720 is mechanically coupled to the frame 702 through a mechanical coupling 722. The mechanical coupling 722 can be a rotary coupling or any suitable coupling. In practice, the boom 720 can be mechanically coupled to the frame 702 through any suitable technique. In one embodiment, the boom 720 is flexible. The boom 720 supports an electronic device 724, such as a micro-display. In practice, any suitable electronic device can be supported by the boom 720.

A band 726 is configured to be worn substantially across the crown of the head of the user. The band 726 can be detachably coupled to the mechanical posts 714, 716. In this mode of operation, the boom 720 is located on the left side of the user's face. In a second mode of operation, the frame 702 is turned upside-down and the mechanical posts 714, 716 can be detachably coupled to the set of attachment features 704, 706 on the frame 702. In this mode of operation, the boom 720 is located on the right side of the user's face.

The band 726 can be fabricated from a flexible material, such as cloth, plastic, rubber or sheet-metal, for example. The length of band 726 is adjustable using straps 730. In one embodiment, one or more cushions 732 can be coupled to the mechanical posts 714, 716. In operation, the back of the user's head contacts the cushions 732. The cushions 732 provide comfort and stability when the user is wearing the headset 700.

Figure 8:
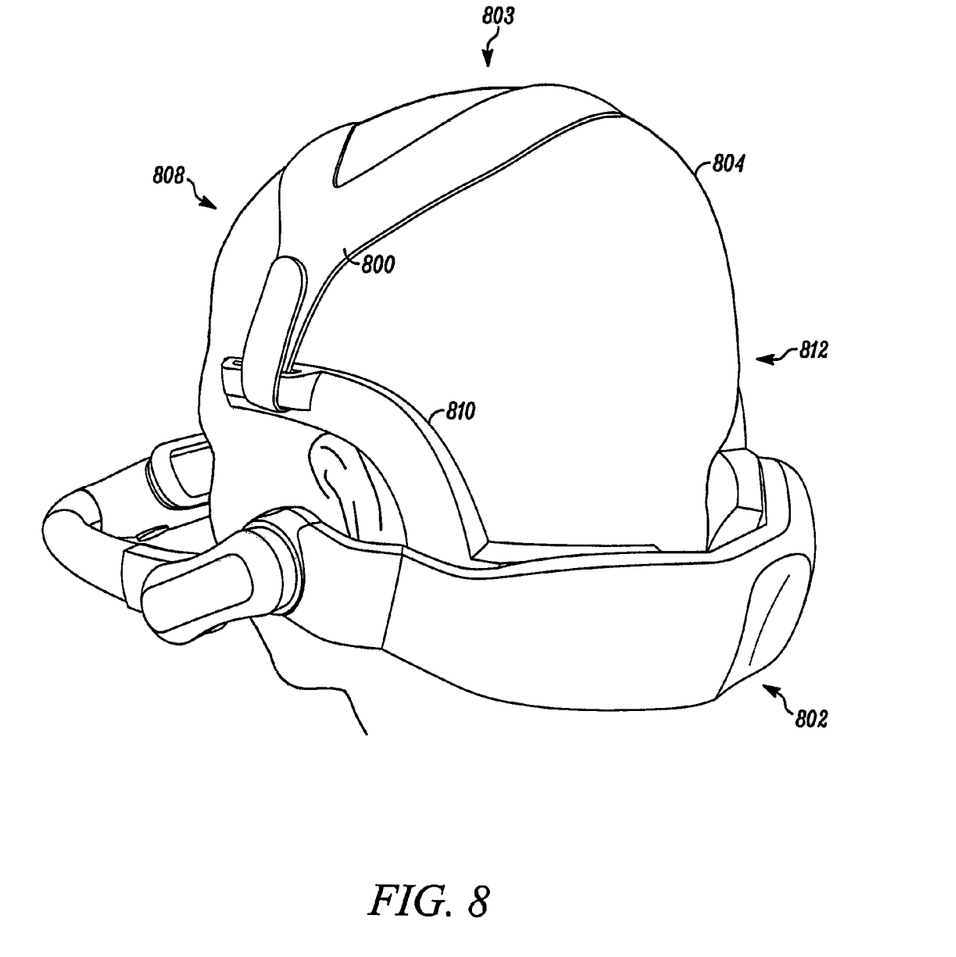
FIG. 8 illustrates a bifurcated head band for use with a headset of the present invention.

FIG. 8 illustrates a bifurcated head band 800 for use with a headset 802 of the present invention. The bifurcated head band 800 is positioned across the crown 803 of the head 804. The bifurcated head band 800 can improve stability of the headset 802 by contacting a larger surface area of the crown 803 closer to the forehead 808 as compared with a standard head band (not shown). The bifurcated head band 800 is coupled to mechanical posts 810, 812 using Velcro®-type closures. In practice, a head band having any suitable shape can be used.

Figure 9:
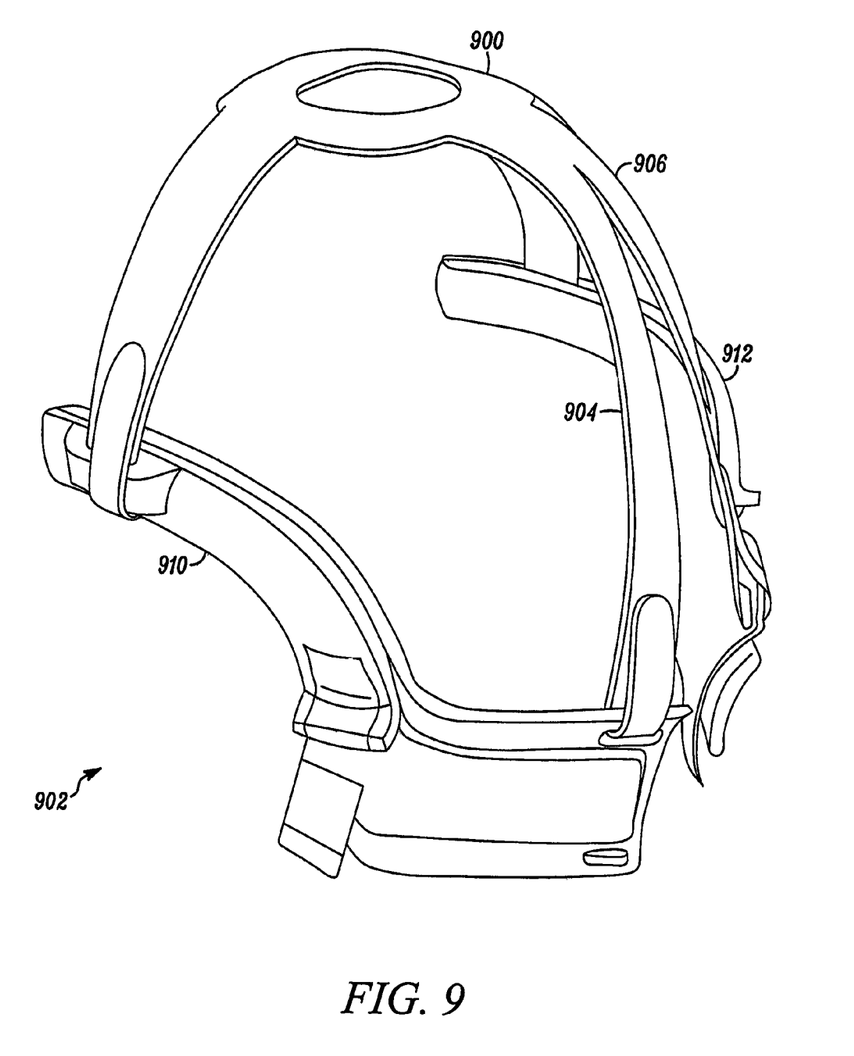
FIG. 9 illustrates another head band for use with a headset of the present invention.

FIG. 9 illustrates another head band 900 for use with a headset 902 of the present invention. The head band 900 is positioned across the crown of the head. The head band 900 can increase stability of the headset 902 by providing additional straps 904, 906 across the back of the user's head. The head band 900 is coupled to mechanical posts 910, 912 using Velcro®-type closures.

Figure 10:
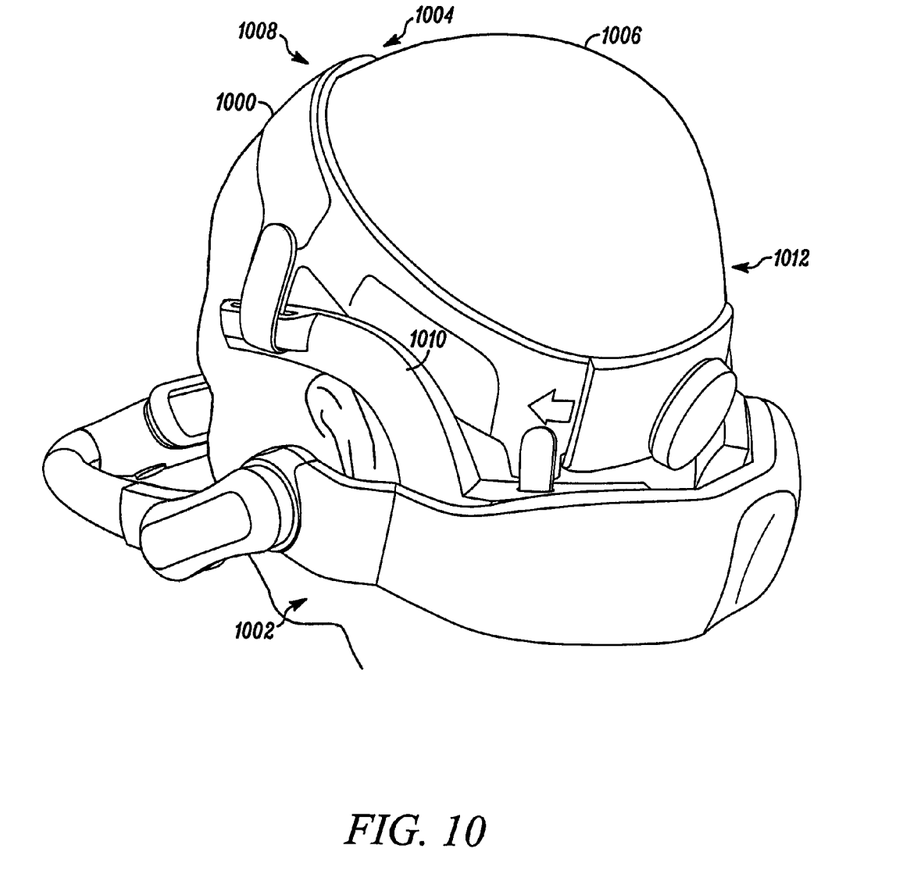
FIG. 10 illustrates another head band for use with a headset of the present invention.

FIG. 10 illustrates another head band 1000 for use with a headset 1002 of the present invention. The head band 1000 is positioned across the crown 1004 of the head 1006 toward the forehead 1008. The head band 1000 can be used with a hard hat (not shown). In one embodiment, the headband 1000 can replace the head band that is provided in most hard hats. The headband 1000 can increase stability of the headset 1002 by contacting the circumference of the top of the user's head 1006. The head band 1000 is coupled to mechanical posts 1010, 1012 using Velcro®-type closures.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for the near-field wireless device pairing described herein. The non-processor circuits may include, but are not limited to, a radio receiver, a radio transmitter, signal drivers, clock circuits, power source circuits, and user input devices. As such, these functions may be interpreted as steps of a method to perform the near-field wireless device pairing described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise; and
h) no specific sequence of acts or steps is intended to be required unless specifically indicated.

What is claimed is:

1. A headset comprising:
a frame configured to be worn substantially behind the ears of a user, the frame comprising a top surface having a first plurality of attachment features and a bottom surface having a second plurality of attachment features;
a boom configured to be mechanically coupled to the frame, the boom supporting an electronic device; and
a band configured to be worn substantially across the crown of the head of the user, the band being detachably coupled to the first plurality of attachment features such that the boom is oriented on a first side of the frame in a first mode of operation and the band being detachably coupled to the second plurality of attachment features such that the boom is oriented on a second side of the frame in a second mode of operation.

2. The headset of claim 1, wherein the first side of the frame is opposite to the second side of the frame.

3. The headset of claim 1, wherein the electronic device further comprises one of a display, a microphone, a camera, and a data capture device.

4. The headset of claim 1, wherein the boom is flexible.

5. The headset of claim 1, wherein the mechanical coupling further comprises one of a rotary coupler and a linear coupler.

6. The headset of claim 1, further comprising a speaker coupled to the frame and positioned proximate to an ear of the user.

7. The headset of claim 1, wherein the band further comprises a flexible material.

8. The headset of claim 1, further comprising a power supply coupled to the frame, the power supply providing power to the electronic device.

9. The headset of claim 1, further comprising a processing module coupled to the frame.

10. The headset of claim 1, further comprising a cushion coupled to the frame, the cushion contacting the head of the user.

11. The headset of claim 1, further comprising a plurality of mechanical posts having an additional plurality of attachment features that correspond to the first and the second plurality of attachment features, the band being detachably coupled to the additional plurality of attachment features.

12. A headset comprising:
a frame configured to be worn substantially behind the ears of a user, the frame comprising a top surface having a first plurality of attachment features and a bottom surface having a second plurality of attachment features;
a boom configured to be mechanically coupled to the frame, the boom supporting a display; and
a band configured to be worn substantially across the crown of the head of the user, the band being detachably coupled to the first plurality of attachment features such that the boom is oriented on a left side of the frame in a first mode of operation and the band being detachably coupled to the second plurality of attachment features such that the boom is oriented on a right side of the frame in a second mode of operation.

13. The headset of claim 12, wherein the left side of the frame is opposite to the right side of the frame.

14. The headset of claim 12, wherein the display further comprises a micro-display.

15. The headset of claim 12, wherein the boom is flexible.

16. The headset of claim 12, further comprising a speaker coupled to the frame and positioned proximate to a left ear of the user in the first mode of operation and positioned proximate to a right ear of the user in the second mode of operation.

17. The headset of claim 12, wherein the band further comprises a flexible material.

18. The headset of claim 12, further comprising a power supply coupled to the frame, the power supply providing power to the display.

19. The headset of claim 12, further comprising a processing module coupled to the frame.

20. The headset of claim 12, further comprising a cushion coupled to the frame, the cushion contacting the head of the user.

21. The headset of claim 12, further comprising a plurality of mechanical posts having an additional plurality of attachment features that correspond to the first and the second plurality of attachment features, the band being detachably coupled to the additional plurality of attachment features.

22. The headset of claim 12, wherein the mechanical coupling further comprises one of a rotary coupler and a linear coupler.

* * * * *